April 30, 1968  G. R. GIANNINI  3,380,626

SINGLE SEED SELECTOR AND PLANTER

Filed July 28, 1965  5 Sheets-Sheet 4

INVENTOR.
GEORGE R. GIANNINI
BY
Lothrop & West
ATTORNEYS

United States Patent Office 3,380,626
Patented Apr. 30, 1968

3,380,626
SINGLE SEED SELECTOR AND PLANTER
George R. Giannini, Davis, Calif., assignor to The Regents of The University of California, Berkeley, Calif.
Filed July 28, 1965, Ser. No. 475,359
4 Claims. (Cl. 221—200)

ABSTRACT OF THE DISCLOSURE

A single seed is selected from an open-top cup by vacuum provided in a tube by a piston movable in a cylinder carrying the tube. The piston is spring and cam actuated and the cylinder moves the tube from a position over the cup to another position at which the seed is discharged from the tube by a rise in tube pressure.

My invention relates to devices for segregating a single seed from a bulk or mass of similar seeds as a preliminary operation. The invention also includes, if desired, means for planting the seed or for preparing the seed in some special fashion for subsequent planting.

In many agricultural operations; for example in lettuce growing, the seeds utilized are relatively small and are supplied in bulk. Ordinary methods of handling the seed involve the planting of a large number of seeds in a relatively restricted area so that more than the ultimately desired number of plants ultimately emerge. These require subsequent thinning to afford the desired, even spacing between the lettuce heads. There are variations in this method of growing. Most of these involve the positioning of single seeds on or in some sort of carrier such as a tape or tube or paper so that the single seeds are spaced apart and are planted at the finally desired plant spacing. As a further variation in planting technique, the seeds are sometimes planted in flats. They are singly planted at spaced locations in the earth of the flats. After the plants emerge, they are transplanted into the growing field at the desired plant interval. All of the preferred methods of culture, as distinguished from the present multiple seed arrangement, at some stage involve the planting or handling of a single seed. That is, there is the necessity as a preliminary matter of selecting or segregating a single seed from a bulk of seeds.

It is therefore an object of my invention to provide a single seed selector effective to remove but one seed at a time from a bulk of seeds.

Another object of the invention is to provide a single seed selector with which can be incorporated a seed planter so that the combined mechanism is effective to utilize seeds in bulk and to plant but a single seed at a time in a given location.

Another object of the invention is to provide a single seed selector effective to extract but a single seed at a time from seeds in bulk and to discharge the selected seed at a predetermined location for further handling; that is, either for planting in the ground or for processing in connection with a tape or tube or in a flat.

Another object of the invention is to provide a single seed selector which in no way damages the selected seeds or renders them unviable.

Another object of the invention is to provide a single seed selector effective for use with quite small seeds; for example lettuce seeds.

Another object of the invention is to provide a single seed selector that is simple and rugged mechanically to withstand the rigors of field operation.

Another object of the invention is to provide a single seed selector effective with a variety of seeds and operable at a number of different speeds.

A still further object of the invention is to provide a single seed selector which operates uniformly with various seeds.

A still further object of the invention is in general to provide an improved single seed selector and planter.

Other objects of the invention together with the foregoing are attained in the embodiments of the invention described in the accompanying description and illustrated in the accompanying drawings, in which.

Figure 1:
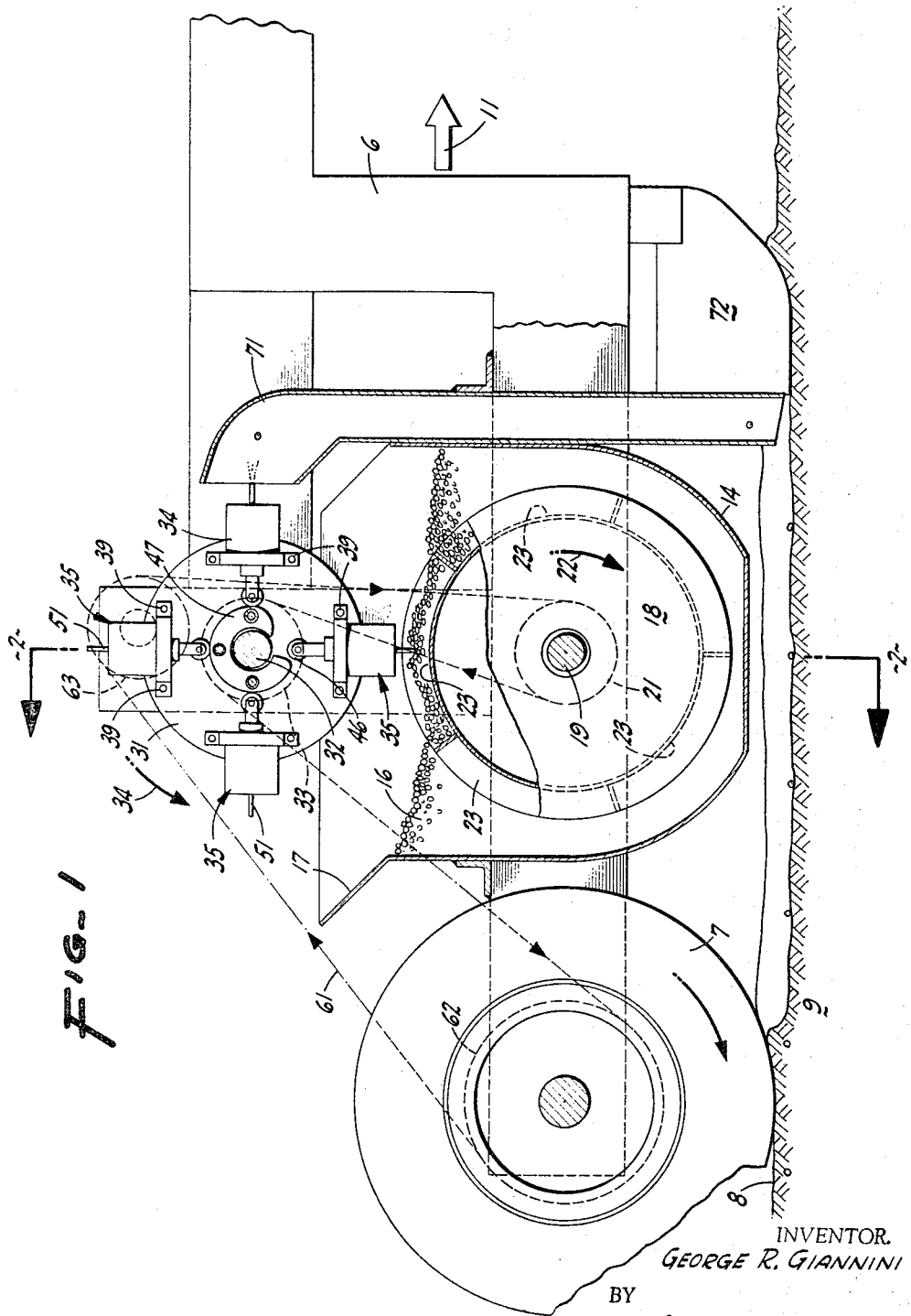
FIGURE 1 is a side elevation of one form of single seed selector and planter constructed in accordance with my invention, the view being for the most part a cross section on a vertical, longitudinal plane.

While the single seed selector and planter pursuant to the invention can be embodied in a large number of different ways, it has successfully been incorporated as disclosed herein. In the arrangement shown in FIGURES 1 and 2, the seed selecting device is incorporated with a planter. The device includes a main frame 6 having ground-engaging wheels 7 at one end adapted to run on the surface 8 of the ground 9. The frame 6 at its other end is designed for attachment by means (not shown) to any sort of support and draft vehicle such as a tractor. As the frame 6 is advanced in the direction of the arrow 11 over the ground 9, the wheel 7 is rotated.

Disposed on the frame 6 is a bulk seed container 14. This is a vessel for holding a large, random supply 16 of the seeds being handled. There is a lip 17 along one edge of the container 14 so that the container can readily be replenished from time to time.

In order to move a relatively restricted number of seeds from the bulk container and to put them into a standard or predetermined position despite the fluctuating supply or level of seeds in the container, a cup wheel 18 is mounted on the frame within the container. This structure is fastened on a cross shaft 19 journalled in the frame 6 and having a rotating element such as a sprocket 21 fixed thereon so that the cup wheel can be rotated in the direction of the arrow 22. The cup wheel is formed to provide a plurality of containers or cups 23 arranged about its periphery. These cups carry any approximately predetermined number of seeds and can be of the size proportionally shown in FIGURE 1 or can be considerably smaller if desired. For example, each cup may hold only six to twelve seeds at a time. The function of the cup wheel is to rotate the cups from a position beneath the bulk of seed 16 in the container, no matter how many seeds there are therein, and to bring a predetermined or roughly measured body of seeds up to the uppermost location of the cup wheel. There is thus always ensured a supply of seeds at a given location in the uppermost portion of the container 14.

To cooperate with the cup wheel, a pickup wheel 31 is provided. This is mounted on a cross shaft 32 extending from the frame and is provided with a drive sprocket 33 so that the pickup wheel can be rotated in the direction of the arrow 34 in FIGURE 1. This direction of rotation is opposite to the direction of rotation of the cup wheel, but with substantially the same peripheral speed. The pickup wheel has mounted thereon a number of pickup devices 35. Each of these is like the others so that a description of one applies to all. In this modification of the device, there are four pickup devices. They are arranged at equal intervals on the pickup wheel. As shown in detail in FIGURE 2, each of the pickup devices includes an expansible chamber mechanism having a cylinder 36. This is substantially closed by a wall 37 at one end and is partially closed by a bracket wall 38 at the other end. The bracket wall is secured to the pickup wheel 31 by appropriate fastenings 39.

The cylinder 36 is provided with a piston 41 arranged to reciprocate radially within the cylinder under the influence of a coil spring 42 on one side of the piston which impels the piston inwardly of the cylinder and urges a piston rod 43 to reciprocate through a boss 44 in the cylinder head wall 38. The piston rod 43 at its inner extremity carries a cam follower roller 46 urged into abutment with a cam 47 by the spring 42. The cam is in substantially ring form and is held stationary about the shaft 32 by support rods 49 extending from the frame 6. With this arrangement, as the pickup wheel rotates, the various expansible chamber mechanisms rotate therewith. Due to the interaction of the followers 46 and the cam 47, the pistons 41 are reciprocated in such a fashion that the extensible chambers are contracted during a major portion of the rotation of the pickup wheel and so that the expansible chambers are in expanded condition when the chamber mechanisms are near the cup wheel.

From each of the pickup mechanisms, a relatively small diameter tube 51 extends radially. The free end 52 of the tube has an opening 53 therein. Since the pickup wheel 31 is appropriately synchronized with the cup wheel 18, each tube 51 lodges substantially centrally of a respective one of the various cups when the cups are in their uppermost position. There is no tangential nor axial relative motion between the tubes and the cups in this form of device, and the difference in radial motion is very slight in the uppermost position of the cups.

The interconnection and synchronization of the two wheels is arranged by a chain 61 trained around a sprocket 62 on the ground-engaging wheel 7 and also trained around the sprockets 21 and 33 of the cup wheel and the pickup wheel, respectively. The chain also passes around an idler sprocket 63 mounted on the frame 6. During the advance of the frame 6 over the ground 9, the wheels rotate appropriately so that the expansible chamber mechanisms are substantially in their contracted form, and the springs 42 are compressed or cocked for much of the rotational movement. As the individual tubes 51 approach and lie in the subjacent cups on the synchronized cup wheel, the cam roller 46 rides off the radially high portion of the cam. The piston 41 is thus left solely under the control of the spring 42 and is so driven radially inwardly in the cylinder. In this fashion, the pressure within the cylinder is reduced to a subatmospheric pressure and thus induces an influx of atmospheric air through the tube 51.

Since the tube has a much smaller diameter than the diameter of the cylinder 36, even though there is a substantial force exerted by the spring 42, the piston 41 moves relatively slowly and in so doing maintains a reduced pressure zone around the free end 52 of the tube 51. The size of the tube; that is to say, its diameter, is generally related to the size of the particular seeds being handled. There is little or no relative movement between the tube and the seeds. The tube thus encounters but few seeds in its immediate vicinity when the air pressure in the vicinity of the tube end is subatmospheric. The result is that but a single, adjacent seed is impelled to overlie the opening 53 and stops the influx of air. The single, selected seed is thus held in position by the difference between the atmospheric pressure on the outside and the subatmospheric pressure on the inside. This difference of pressure is sufficient to hold the seed in position across the end of the tube 51 as the tube tip passes with a radial withdrawal from a position within the subjacent cup. The seed on the tube thus travels from a position referred to as a loading station or loading zone into an advanced station, as particularly shown in FIGURE 1, referred to as a discharge station, without being dragged through a mass of bulk seed or otherwise subjected to dislodging forces.

Figure 2:
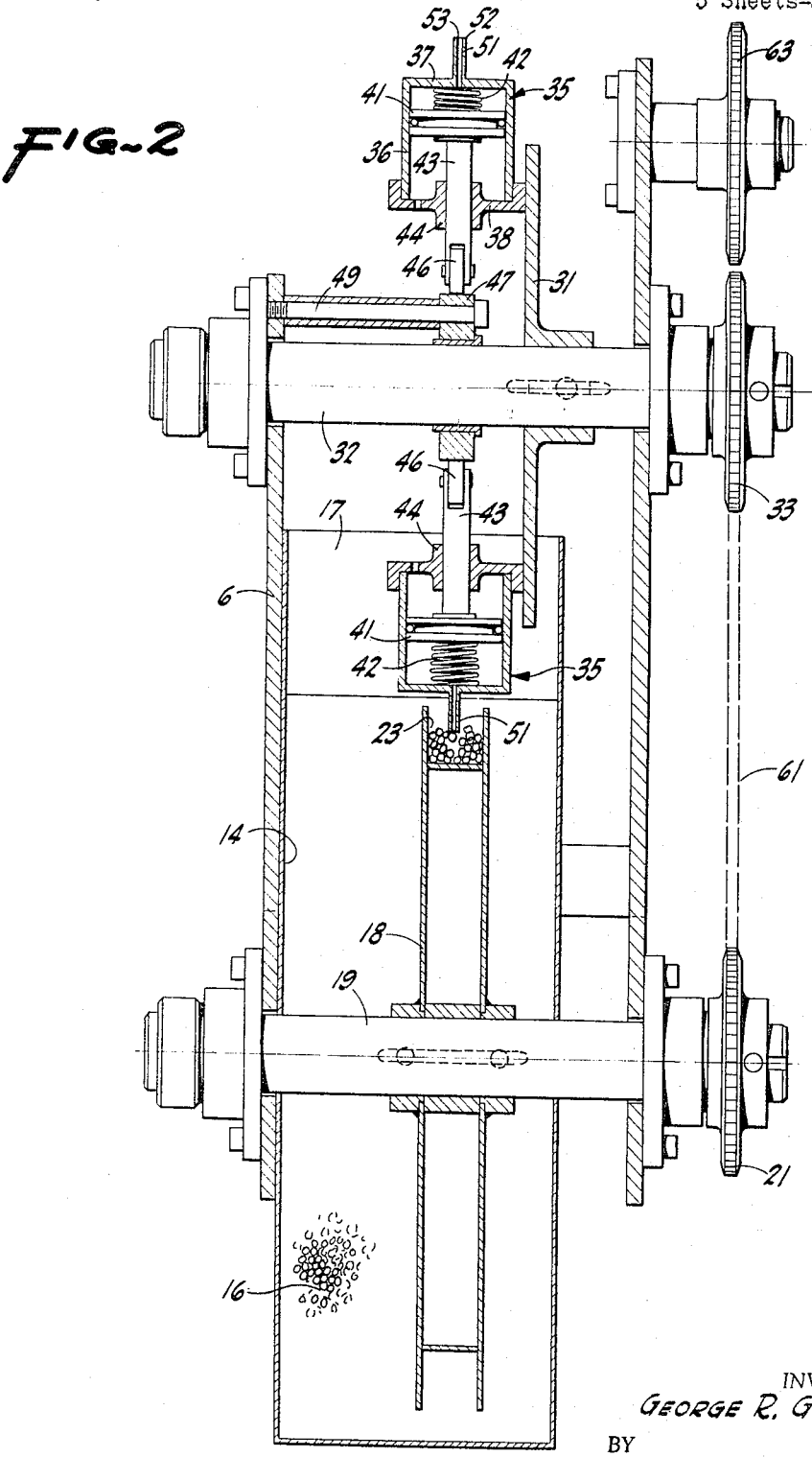
FIGURE 2 is a cross section to an enlarged scale, the plane of section being indicated by the line 2—2 of FIGURE 1.
Figure 3:
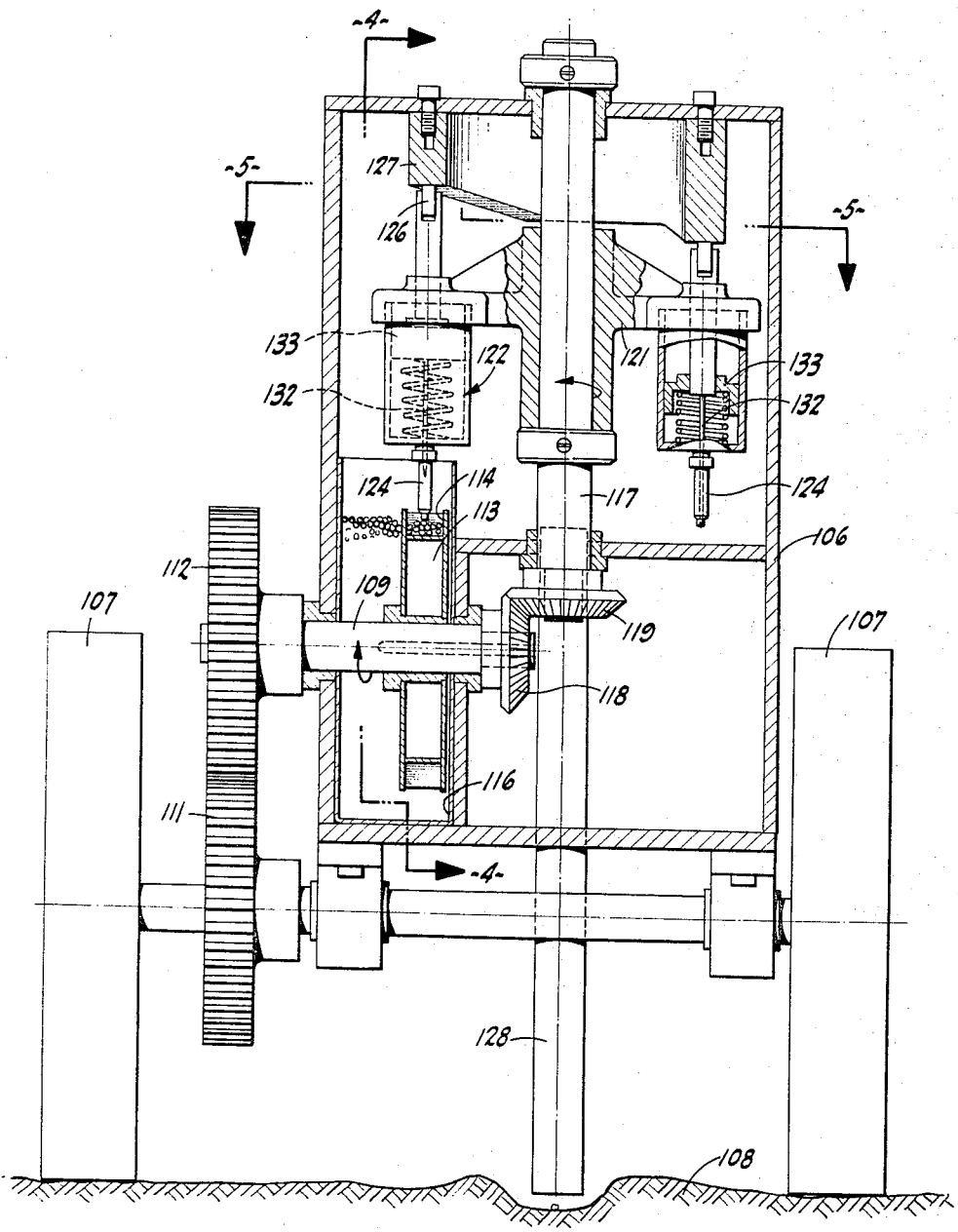
FIGURE 3 is a cross section similar to FIGURE 2 but showing a modified form of seed selector and planter constructed pursuant to the invention.
Figure 4:
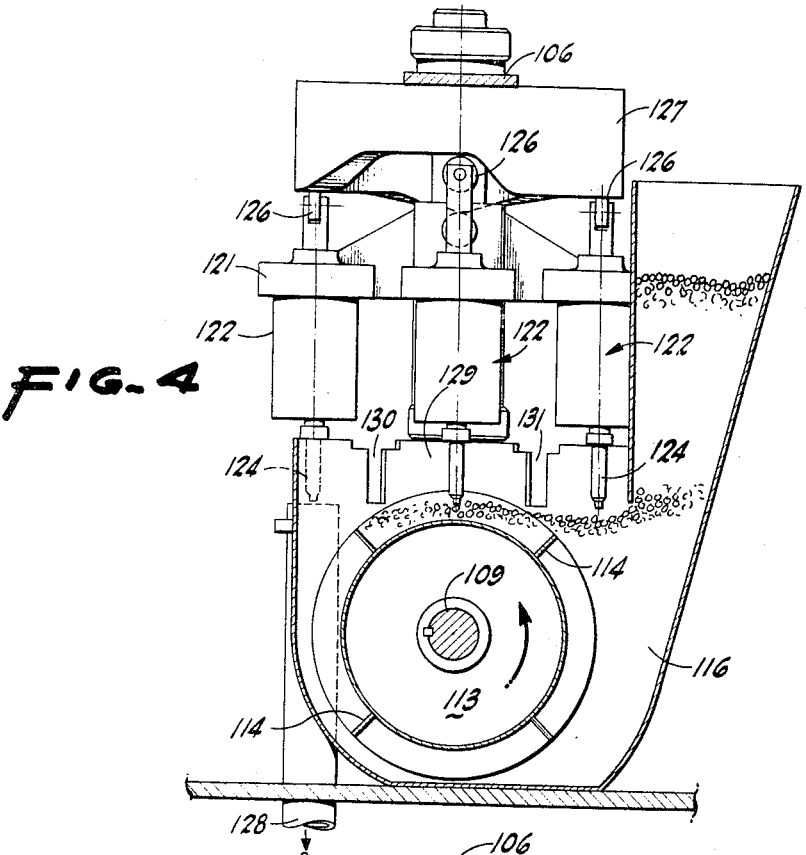
FIGURE 4 is a view to a reduced scale, the planes of the view being indicated by the lines 4—4 of FIGURE 3.
Figure 5:
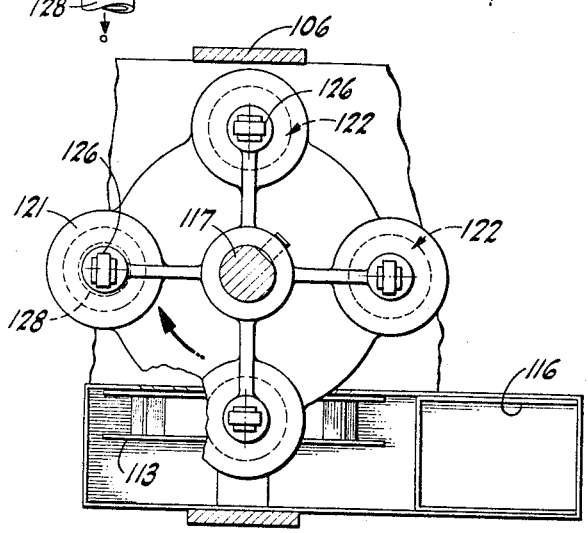
FIGURE 5 is a cross section, the plane of which is indicated by the lines 5—5 of FIGURE 3.

As the pickup wheel continues to turn, the lowermost tube, as shown in FIGURE 1, advances with a single seed blocking the end thereof until it is in a substantially horizontal position at the discharge location. In the vicinity of that position the roller 46 encounters a riding ramp of the cam 47 so that the piston 41 is driven radially outwardly of the cylinder. This not only compresses the spring 42, but also first equalizes the pressure within the cylinder with that of the atmosphere and subsequently may produce a super-atmospheric pressure within the cylinder. Under these conditions, the single seed which has been removed from the cup and has been carried around on the end of the tube is no longer held in position and may be rather suddenly expelled. The timing is such that the seed drops by gravity or is expelled and flies into a receiving pipe 71. This is arranged on the frame 6 in a generally vertical position and is designed to catch the dislodged seed and to guide it as it falls by gravity to drop onto the ground 9 beneath the machine. Appropriate devices such as a furrow attachment 72 can be provided for pre-conditioning the ground 9 and one of the rear wheels 7 or other similar devices can be provided for covering the singly dropped and properly spaced seeds.

The effect of this arrangement is to segregate a single seed from a bulk supply and periodically to discharge the single selected seeds onto the ground and thus plant them singly at appropriate intervals. The sprocket ratios can be easily changed to vary the spacing between the deposited seeds.

If desired, actual planting can be postponed and the ground can be replaced by a tape; for example a paper tape, which rolls under the frame 6 held stationary but with the wheels 7 revolving as before. Under these circumstances, the single seeds are selected and are deposited at intervals on the paper tape travelling beneath the machine. If these seeds are adhesively secured, there is provided a seed tape which can be rolled up for storage and can ultimately be planted as a unit in appropriately prepared ground.

In a modified form of the arrangement, there is provided a machine frame 106 substantially as before mounted on wheels 107 adapted to engage the ground 108. As the wheels 107 advance with the machine, they rotate a cross shaft 109 through appropriate gears 111 and 112. The gear 112 turns the shaft 109 so that a cup wheel 113 thereon is rotated. A plurality of cups 114 on the cup wheel are brought in turn from a lower position in a seed container 116 into an upper position therein. There is also provided a vertical shaft 117 synchronized in its rotation with the shaft 109 by the interengagement of a pair of bevel gears 118 and 119. The shaft 117 carries a pickup wheel 121 with a plurality of pickup devices 122 arranged thereon. These devices again are all identical, and each one comprises an expansible chamber mechanism.

In this instance, instead of being arranged radially with respect to the rotational axis of the wheel, the devices 122 are arranged in a ring and are disposed axially with respect thereto. Each device is provided with a tube 124 as before. In this instance, the rollers 126 of the expansible chamber mechanisms contact a cylindrical cam 127 secured to the frame 106 and arranged to expand the chamber mechanisms as before. While the cup wheel and the pickup wheel travel in different paths, they meet at a loading station with very little unfavorable relative motion. At a discharge station is the open end of a tube 128 arranged on the frame 106 and designed to receive and to guide the singly selected seeds as before. As a particular means for isolating the bulk seed container 116 from its associated parts, there is provided a relatively high side wall 129 having interruptions 130 and 131 therein to permit of the passage of the tubes 124.

While the operation of the tubes 124 is as previously described, these tubes are mounted and arranged for an additional function. The tube outlets are quite small, but the remaining body of the tubes is much larger. Each device includes a needle 132 secured to the reciprocable piston 133 and movable between a lower position projecting through the lower end of the tube and an upper position withdrawn well within the larger part of the tube. The contour of the cylindrical cam opposite the supply station affords a depression of the needle through the tube opening a substantial interval after the seed has been dislodged therefrom to make sure that the tube opening is clean and clear for the next use. The needle is well retracted before the tube 124 returns to the supply station.

Figure 6:
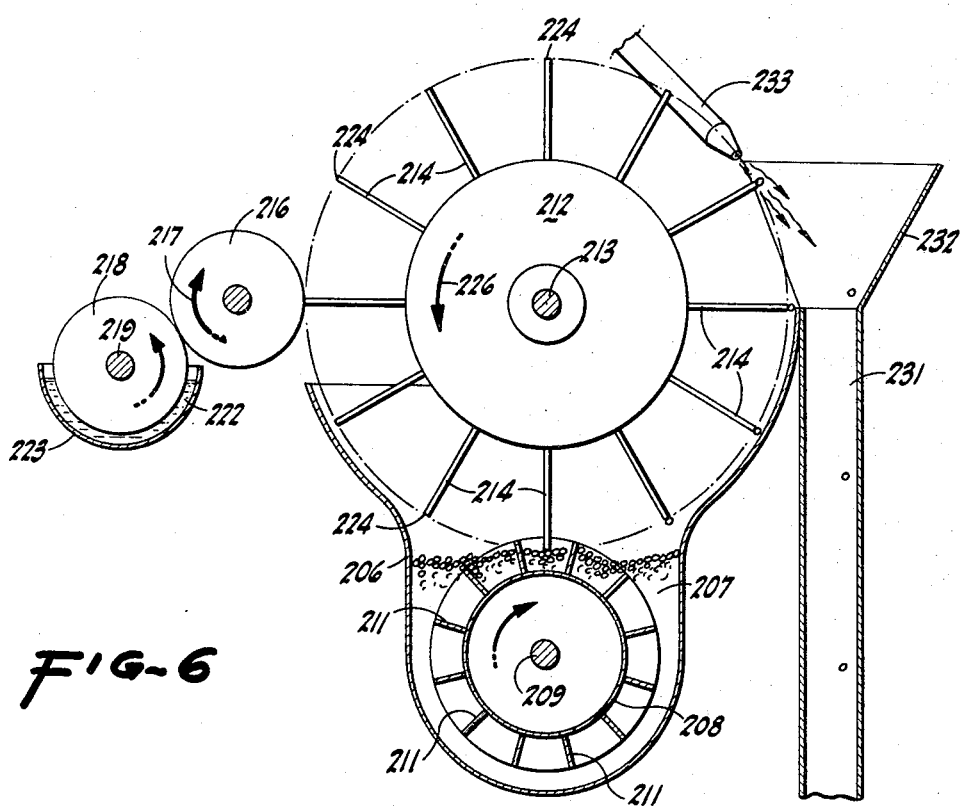
FIGURE 6 is a cross section on a vertical longitudinal plane through a further modified form of device pursuant to the invention.

As another variation involving substantially the same principals of operation of the cup wheel and the pickup wheel, but avoiding the employment of the expansible chamber mechanisms, there is provided a mechanism (FIGURE 6) involving a container 206 for receiving a bulk supply of seeds 207. Within the container, a cup wheel 208 is arranged for rotation on a shaft 209. A number of cups 211 about the periphery of the cup wheel pick up the seeds from the container 206 and lift them into a loading station.

Rotating in an opposite direction with respect to the cup wheel is a pickup wheel 212 mounted on a shaft 213 parallel to the shaft 209. The pickup wheel in this instance does not carry any expansible chamber mechanisms, but does carry a plurality of similar radial rods 214. Since the shafts 209 and 213 are coupled for synchronization by any appropriate means (not shown), each one of the rods 214 turns into a loading position in each one of the subjacent cups. The rod ends at the loading station are almost stationary with respect to seed in the cups. So that the rods may be effective as pickup devices, each of them in its rotation passes by an adhesive wheel 216 mounted for rotation in the direction of the arrow 217. The wheel 216 is in contact with an adhesive feeding wheel 218 mounted on a shaft 219 and rotating in an adhesive bath 222 contained in a reservoir 223.

With this arrangement, each time one of the rods 214 passes into contact with the adhesive feeding wheel 216, the tip 224 of the rod picks up a small quantity of adhesive. This quantity is isolated on the very tip of the rod. Then, as the rod is rotated in the direction of the arrow 226, it penetrates the supply of seeds in the subjacent cup 211 and comes into contact preferably with but a single seed in that cup. The size of the rod and the amount of adhesive on the very tip thereof are chosen to be effective for this purpose. A single seed is thus adhesively secured to the end of the rod. Adjacent or surrounding seeds are not adhesively engaged. As the pickup wheel continues its rotation, the rod rises out of the cup 211 and comes into a discharge position alongside of a discharge chute 231 having a funnel 232 adjacent its top. Arranged at a convenient location with respect to the rising rod is an air blast nozzle 233 from which a continuous or a pulsing jet of air emerges. The direction of the nozzle 233 is such that the efflux of air therefrom is effective despite the adhesive attachment to blow the single seed from the end of the adjacent rod. This discharges and delivers the seed into the funnel-like upper end 232 of the tube 231. The separated seed therein falls by gravity onto any subjacent mechanism, either the ground for planting, as before, or onto a tape or into a flat, as indicated above.

What is claimed is:

1. A single seed selector comprising a frame, a bulk seed container on said frame, a cup wheel, means forming a plurality of cups around the periphery of said cup wheel, means for mounting said cup wheel on said frame to rotate to move said cups through a body of seeds in said bulk seed container and into a supply station, a pickup wheel, a plurality of tubes extending from said pickup wheel, means for mounting said pickup wheel on said frame to rotate to move said tubes between said supply station and a discharge station, means on said frame for rotating said cup wheel and said pickup wheel in synchronism to position one of said cups and one of said tubes at said supply station simultaneously, and means for varying the pressure in said tubes between a subatmospheric pressure when said tubes are in the vicinity of said supply station and a higher pressure when said tubes are in the vicinity of said discharge station.

2. A single seed selector comprising a frame, means for holding a supply of seeds on said frame, an expansible chamber mechanism, a tube connected to and communicating with said mechanism, means for moving said mechanism and said tube first to said holding means and then away from said holding means to a discharge station, and means for operating said mechanism during said movement thereof to expand the volume of said mechanism and induce inflow of air into said tube when said tube is in the vicinity of said holding means to hold a seed on the end of said tube by inward air pressure and to contract the volume of said mechanism and induce outflow of air from said tube when said tube is in the vicinity of said discharge station to expel a held seed from the end of said tube by outward air pressure.

3. A single seed selector comprising a tube, means for moving said tube between a supply station and a discharge station, means at said supply station for presenting seeds to said tube, means at said discharge station for receiving seeds from said tube, and means effective during the movement of said tube for varying the pressure therein between a subatmospheric pressure when said tube is in the vicinity of said supply station and a higher pressure when said tube is in the vicinity of said discharge station, said pressure varying means being an expansible chamber mechanism including a spring for expanding the volume of said expansible chamber mechanism and a cam and follower for contracting the volume of said expansible chamber mechanism.

4. A single seed selector comprising a frame, a cylinder having a substantially closed end, a tube projecting from said cylinder and opening through said end into said cylinder, a piston reciprocable in said cylinder, a cup for holding a supply of seeds, means on said frame for mounting said cylinder and said cup for relative motion between a supply position and a discharge position, a spring urging said piston outwardly of said cylinder, and a cam on said frame for moving said piston inwardly of said cylinder and cocking said spring when said tube is in the vicinity of said discharge position and for releasing said piston to move outwardly of said cylinder when said tube is in the vicinity of said supply position.

References Cited

UNITED STATES PATENTS

| | | | |
|---|---|---|---|
| 1,354,202 | 9/1920 | Lafleche. | |
| 1,762,671 | 6/1930 | Slathar | 221—211 |
| 2,455,701 | 12/1948 | Putman et al. | 111—38 |

ANTONIO F. GUIDA, *Primary Examiner.*

ABRAHAM G. STONE, *Examiner.*

R. C. HARRINGTON, *Assistant Examiner.*